(12) United States Patent
Purushothaman et al.

(10) Patent No.: US 9,709,121 B2
(45) Date of Patent: Jul. 18, 2017

(54) TWIN WIRE BENDING KINETIC ENERGY ATTENUATION SYSTEM

(71) Applicant: Goodrich Aerospace Services Private Limited, Bangalore, Karnataka (IN)

(72) Inventors: Srijith Purushothaman, Karnataka (IN); Mohinder Saini, Karnataka (IN); Satya Swaroop Panda, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 15/070,721

(22) Filed: Mar. 15, 2016

(65) Prior Publication Data

US 2017/0114853 A1   Apr. 27, 2017

(51) Int. Cl.
  *F16F 7/12* (2006.01)
  *B21D 53/92* (2006.01)
  *B64D 11/06* (2006.01)

(52) U.S. Cl.
  CPC .............. *F16F 7/123* (2013.01); *B21D 53/92* (2013.01); *B64D 11/0619* (2014.12); *F16F 2232/08* (2013.01)

(58) Field of Classification Search
  CPC ....... F16F 7/123; B64D 11/0619; B21D 53/92
  See application file for complete search history.

(56) References Cited

U.S. PATENT DOCUMENTS

| | | | |
|---|---|---|---|
| 3,087,584 A * | 4/1963 | Jackson | B64D 25/04 105/392.5 |
| 3,195,685 A * | 7/1965 | Blackstone | B60R 22/28 188/372 |
| 3,968,863 A | 7/1976 | Reilly | |
| 4,027,905 A * | 6/1977 | Shimogawa | F16F 7/123 188/371 |
| 4,358,154 A | 11/1982 | Campbell | |
| 4,630,716 A * | 12/1986 | Faust | F16F 7/123 188/371 |
| 6,322,103 B1 * | 11/2001 | Li | B62D 1/195 280/777 |
| 6,378,939 B1 * | 4/2002 | Knoll | B60N 2/4242 188/374 |
| 6,394,393 B1 | 5/2002 | Mort | |
| 7,523,987 B2 | 4/2009 | Yamaguchi | |
| 7,878,312 B2 | 2/2011 | Hiemenz et al. | |
| 8,662,265 B2 | 3/2014 | Humfeldt et al. | |

(Continued)

*Primary Examiner* — Bradley King
(74) *Attorney, Agent, or Firm* — Cantor Colburn LLP

(57) ABSTRACT

A mechanism for decreasing kinetic energy includes a carriage to connect to an object, a first wire passing through a top portion of the carriage, a second wire coterminous with the first wire at a top end and a bottom end, a spreading wheel axially fixed in a center position of the carriage between the first and second wires to plastically deform the first and second wires from a substantially parallel configuration to conform to a circumferential surface on two opposing sides of the spreading wheel as the carriage moves from the top to the bottom end, and a pair of despreading wheels axially parallel to and oriented proximal to the spreading wheel such that the first and second wires are deformed by a circumferential surface of each of the despreading wheels such that they are deformed again as the carriage moves from the top to the bottom end.

14 Claims, 4 Drawing Sheets

(56) References Cited

U.S. PATENT DOCUMENTS

2011/0006567 A1* 1/2011 Mullen .................... B60N 2/24
297/216.1
2016/0121765 A1* 5/2016 Desjardins ............... B60N 2/42
701/49

* cited by examiner

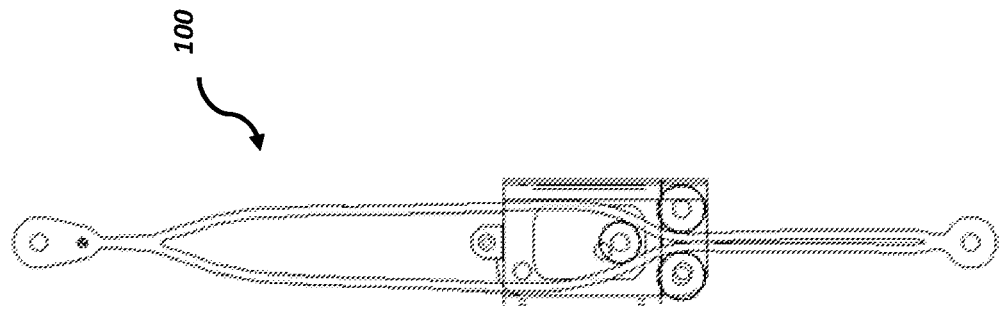
FIG. 3b
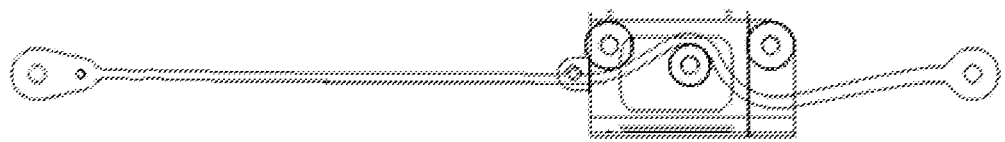
FIG. 3a - Prior Art

TWIN WIRE BENDING KINETIC ENERGY ATTENUATION SYSTEM

BACKGROUND OF THE INVENTION

This application claims priority to Indian Patent Application No. 5703/CHE/2015 filed Oct. 23, 2015, the entire contents of which is incorporated herein by reference.

The present disclosure relates to energy attenuation systems, and more particularly to a kinetic energy attenuation system with twin wire bending.

Military aircraft including rotorcraft and helicopters may undergo high vertical accelerations and/or decelerations in fast (hard) landing scenarios. Energy absorption with respect to hard landings may help preserve health and safety of aircraft occupants. Conventional aircraft cockpit seats may include energy attenuation systems designed to absorb vertical accelerations/decelerations. The "wire bender type" is one of the most commonly used mechanisms for energy absorption in seating products. Conventional wire bender-type absorption devices may include two or three rollers and a single wire. The wire is often fixed to the aircraft structure, while the rollers are often connected to the seat bucket. In situations having extreme vertical accelerations/decelerations, the rollers on the wire may plastically deform the wire (cyclically bending and unbending the wire), thereby absorbing the energy from the vertical acceleration/deceleration. The wire often increases in cross section from the top side of the wire that is bent at the beginning of the deceleration to the bottom side of the wire bent at the end of the deceleration. However, due to the limited available stroke length for seat structure, heavier occupants may be difficult to accommodate with conventional systems.

SUMMARY OF THE INVENTION

According to one embodiment, a mechanism for decreasing kinetic energy may include a carriage configured to connect to an object, a first wire passing through a top portion of the carriage, a second wire coterminous with the first wire at a top end and a bottom end, a spreading wheel axially fixed in a center position of the carriage between the first and second wires and configured to plastically deform the first and second wires from a substantially parallel configuration to conform to a circumferential surface on two opposing sides of the spreading wheel as the carriage moves from the top end to the bottom end, and a pair of despreading wheels axially parallel to the spreading wheel and oriented proximal to the spreading wheel such that the first and second wires are plastically deformed by a circumferential surface of each of the despreading wheels such that the first and second wires are deformed again as the carriage moves from the top end to the bottom end.

According to another embodiment, a method for decreasing kinetic energy can include coupling a carriage configured to connect to an object, passing a first wire through a top portion of the carriage, passing a second wire coterminous with the first wire at a top end and a bottom end, passing the first and second wires around opposing sides of a spreading wheel axially fixed in a center position of the carriage, the spreading wheel, in operation, plastically deforming the first and second wires to conform to a circumferential surface of the spreading wheel when the carriage moves from the top end to the bottom end, and passing the first and second wires between a pair of despreading wheels axially parallel to the spreading wheel and oriented proximal to the spreading wheel such that the first and second wires may be plastically deformed by a circumferential surface of the despreading wheels such that they are closer together than when on opposing sides of the spreading wheel. Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3a depicts prior art;

FIG. 3b depicts a front view of a partially actuated twin wire bending kinetic energy attenuation system of FIG. 1;

DETAILED DESCRIPTION OF THE INVENTION

Figure 1:
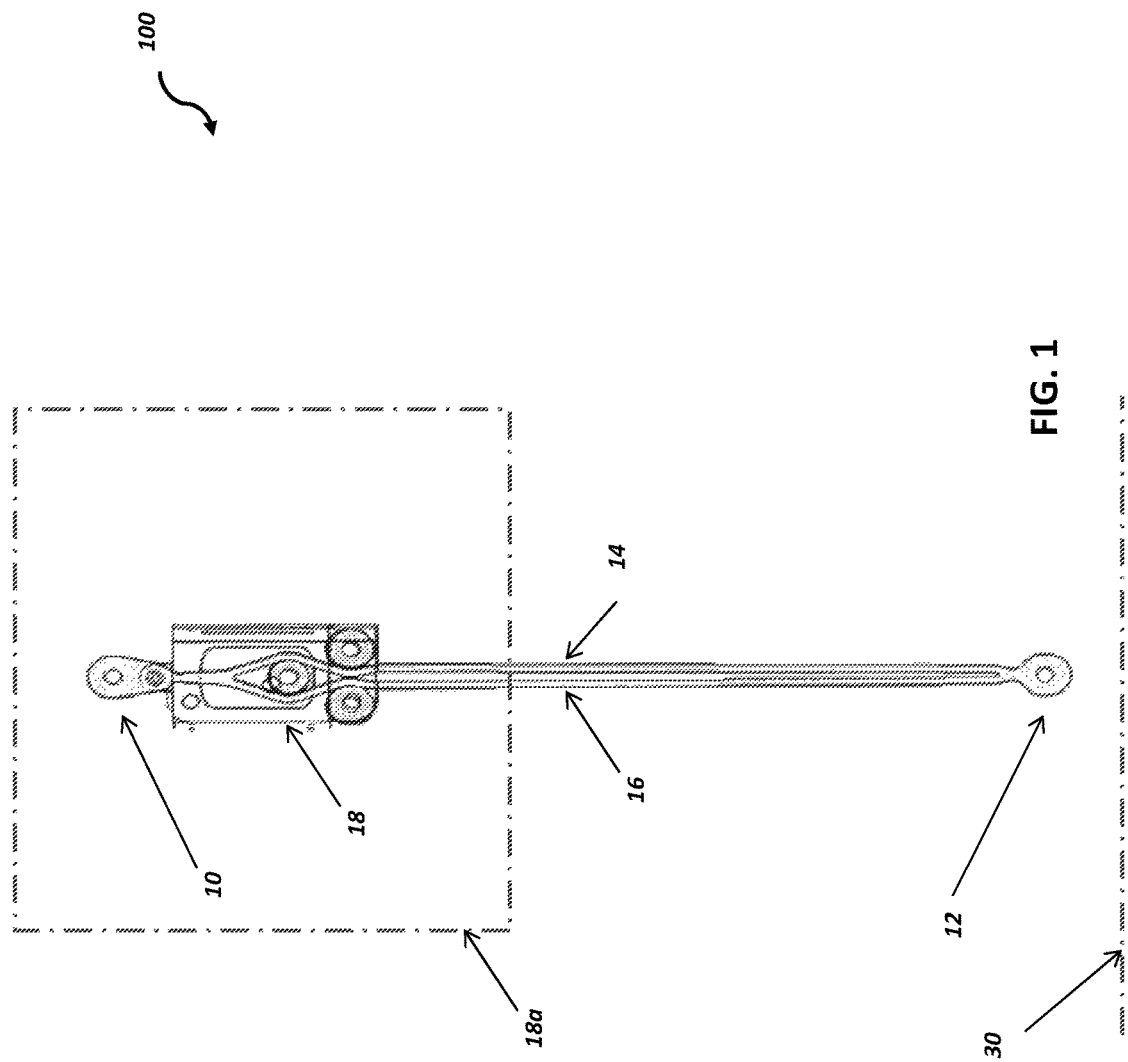
FIG. 1 depicts a front view of a twin wire bending kinetic energy attenuation system according to one embodiment.

FIG. 1 depicts a front view of a twin wire bending kinetic energy attenuation system 100, according to one embodiment. System 100, as illustrated, includes twin wires 14 and 16 and a carriage 18. Carriage 18 may be configured to receive wires 14 and 16 through a top portion of the carriage. Wires 14 and 16 may be configured to feed through a configuration of spreading and dispreading wheels (e.g., spreading wheel 20 and dispreading wheels 22 and 24 (depicted in greater detail in FIG. 2). Wires 14 and 16 may be configured to have coterminous and joined ends at top end 10 and bottom end 12.

Twin wires 14 and 16 may be plastically deformable wires configured to absorb kinetic energy by their respective deformation. Wires 14 and 16 may be substantially similar or identical, and have coterminous ends with joining means (e.g., a rivet, grommet, etc.).

Figure 2:
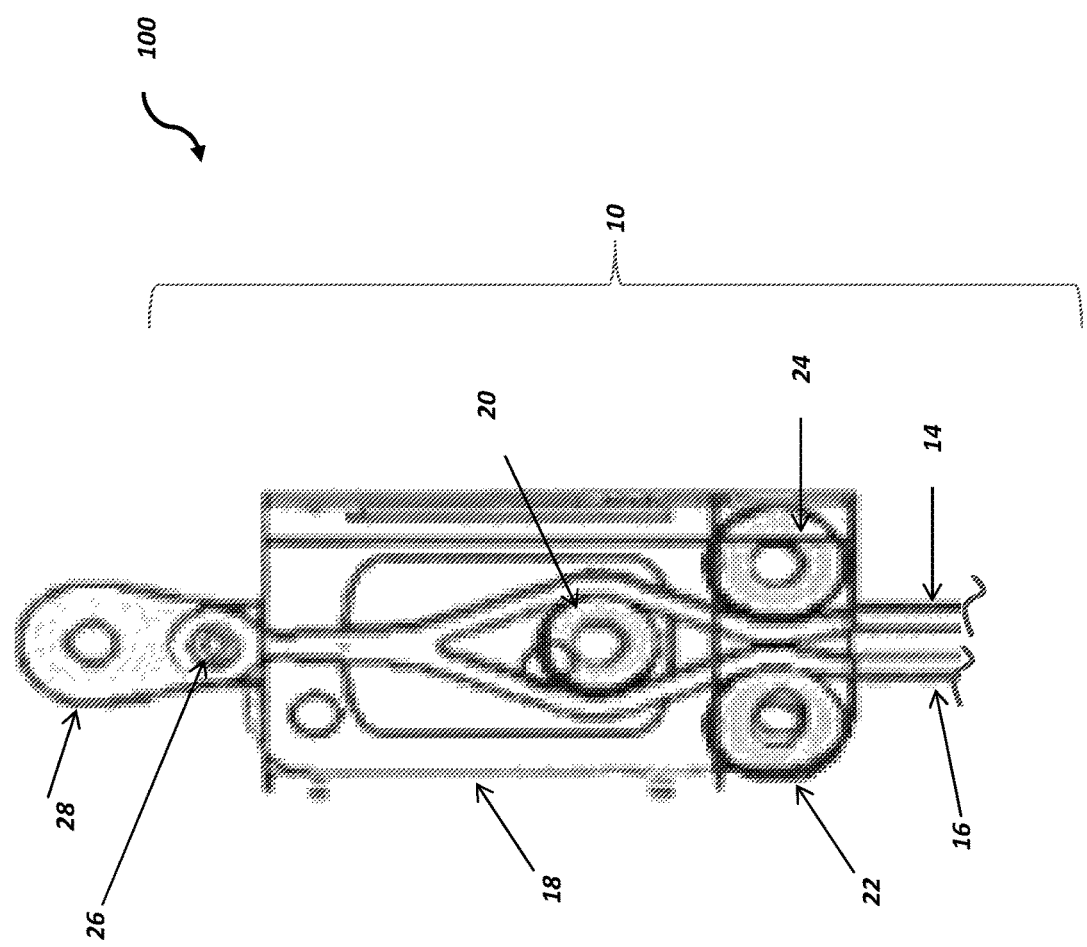
FIG. 2 depicts a detailed view of the system of FIG. 1.

FIG. 2 depicts wires 14 and 16 joined at top end 10 with grommet 26 rigidly fixed to system attaching member 28 which are illustrated as a holed lug. In some embodiments, grommet 26 may be configured to securely hold wires 14 and 16 under normal operational conditions (without extreme vertical decelerations, for example). In some aspects grommet 26 may be configured to fail at a certain vertical force that may exceed normal operational conditions. Accordingly, grommet 26 may be configured to activate system 100 to dissipate energy when normal operational force is exceeded. Wires 14 and 16 may also absorb kinetic energy with exertion of frictional forces from spreading wheel 20 and dispreading wheels 22 and 24. Frictional forces may work in conjunction with wire inertial forces from deformation to absorb kinetic energy from carriage 18.

In some embodiments, wires 14 and 16 may have consistent thickness from one end (e.g., top end 10) to the other end (e.g., bottom end 12). Accordingly, wires 14 and 16 may exert consistent stopping force with respect to carriage 18 thru 28 attached to an object 18a traveling along the length of the wires. In other aspects twin wires 14 and 16 may have varying thickness from end to end, which may absorb varying amounts of kinetic energy with respect to a particular thickness at a corresponding portion along the length. For example, a thick section of wire 14 and/or 16 may require greater force to deform than a thinner section, and thus, may absorb a greater quantity of energy at the thick section. In another example, a wire being thicker at the bottom end 12 than the top end 10 may decelerate carriage 18 at a greater rate with respect to time toward bottom end 12 than when traveling closer to top end 10. In another embodiment, an alternate shape of the cross section of wire 14 and/or 16 may be used in conjunction with complementary shape of spreading wheel 20 and/or dispreading wheels 22 and 24, which may maximize the energy dissipation. In some aspects, energy dissipation can be maximized with complementary wire and wheel shapes.

In some embodiments, system 100 may be configured as a kinetic energy attenuation system for slowing a bucket seat (e.g., object 18a) of an aircraft in a hard vertical landing scenario. For example, system 100 may be configured to attach to a supporting framework (not shown) at top end 10 and bottom end 12, where the framework configures wires 14 and 16 are substantially perpendicular to a deck of an aircraft 30. In some aspects, carriage 18 may be rigidly fixed to a bucket seat (e.g., object 18a) such that in operation, the bucket seat rests in a position closest to top end 10. The bucket seat may float in a vertical position with respect to the rigid frame. In some aspects, object 18a may also connect to object 18a such that a structure (e.g., an aircraft chassis) supports the object before the proposed mechanism becomes functional due to vertical force that exceeds normal operational conditions. For example, in a hard landing situation, the bucket seat may continue downward travel to the earth at the same velocity as the supporting framework (attached to the deck of the aircraft) and the aircraft. As the aircraft touches the surface of the earth (ship deck, water, etc.), the aircraft and supporting framework may come to an abrupt stop from their collective downward velocity after touchdown. The bucket seat, which was vertically free-floating with respect to the supporting structure, and traveling at the same velocity as the aircraft and supporting structure, may continue to travel toward the earth along the length of system 100. In the absence of system 100, the bucket seat would continue to travel toward to the ground at the same rate of travel and come to the same abrupt stop at the same rate as the framework and aircraft. On the other hand, if a seat is configured with system 100, system 100 may gradually absorb the kinetic energy of the bucket seat (and passenger sitting in the bucket), which may minimize injury and/or damage. As the carriage 18 starts movement from top end 10 of wires 14 and 16 toward bottom end 12. In some embodiments, system 100 may linearly or progressively diminish the kinetic energy of the carriage (and attached seat) in an increasing rate with respect to the distance traveled from top end 10. Progressively diminishing the kinetic energy of the seat and carriage may minimize risk of injury to person or property.

Referring again to FIG. 2, a detailed view of a portion of the system 100 is shown. Carriage 18 is depicted near top end 10 of twin wires 14 and 16. Top end 10 may be configured to attach to an object, such as, for example, a framework fixed to the chassis of an aircraft (e.g., in a helicopter). In some embodiments, twin wires 14 and 16 may fasten at both ends (top end 10 is shown in FIG. 2) to a rigid framework fastened to the chassis. Wires 14 and 16 may be joined at the same location using joining means such as, for example, a grommet.

Carriage 18 may include a spreading wheel 20 axially fixed to a center position of carriage 18. Twin wires 14 and 18 may be configured to feed through an opening at the top of carriage 18 and plastically deform around spreading wheel 20. In some aspects, despreading wheels 22 and 24 may also be axially fastened to carriage 18 and be rotatable about their axes. Despreading wheels 22 and 24 may rotate as carriage 18 traverses along the length of twin wires 14 and 16 from top end 10 to bottom end 12 and deform wires 14 and 16 to be substantially parallel. Spreading wheel 20 may be configured as a rigid body that is not rotatable about its axis. In other embodiments, spreading wheel 20 may be configured to rotate axially. Wires 14 and 16 may feed through an opening at the bottom of carriage 18, and connect to bottom end 12 in a fashion similar or the same as the connection at the top end 10.

FIG. 3a depicts an example of a conventional energy dissipation system (e.g., an "existing device") having a single wire. FIG. 3b depicts an exemplary energy dissipation twin wire energy dissipation system 100, in accordance with some embodiments.

Figure 4A:
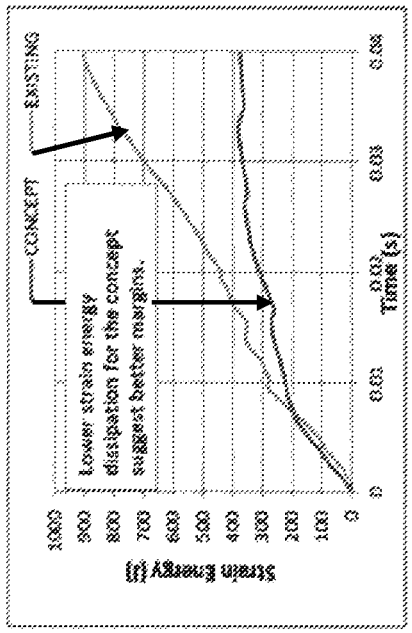
FIG. 4a is a chart comparing the energy gradient of the system of FIG. 1 to the energy gradient of existing devices.

Friction may contribute significantly to the overall energy dissipation in the twin wire mechanism as against the existing (conventional) designs. FIG. 4a depicts a chart comparing the energy gradient of the system of FIG. 3b to the energy gradient of existing devices as depicted in FIG. 3a.

Figure 4B:
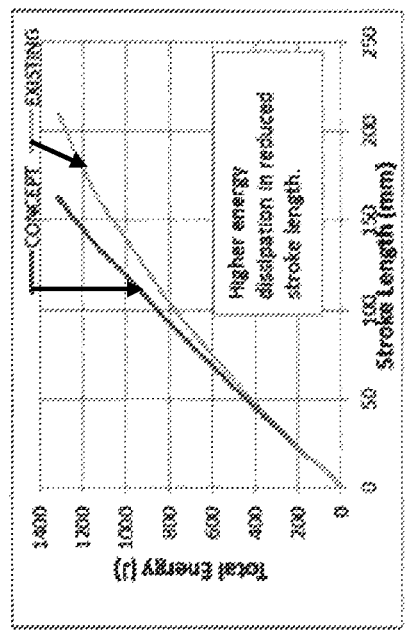
FIG. 4b is a chart comparing the strain energy dissipation of the system of FIG. 1 compared to the strain energy dissipation of existing devices.

FIG. 4b depicts a chart comparing the strain energy dissipation of the system of FIG. 1 compared to the strain energy dissipation of existing devices.

Figure 4C:
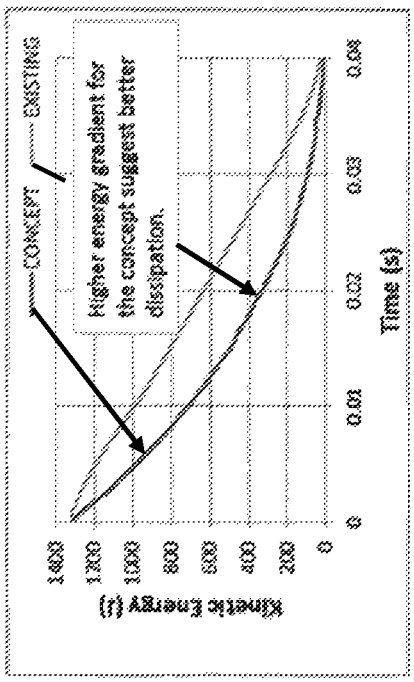
FIG. 4c is a chart comparing sliding energy with respect to time of the system of FIG. 1 compared to sliding energy of existing devices.
Figure 4D:
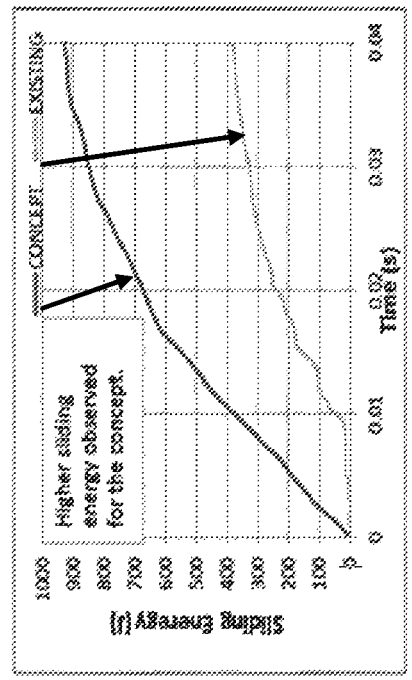
FIG. 4d is a chart comparing total energy with respect to stroke length of the system of FIG. 1 to that of existing devices.

FIG. 4c is a chart comparing sliding energy with respect to time of the system of FIG. 1 compared to sliding energy of existing devices, and FIG. 4d depicts a chart comparing total energy with respect to stroke length of the system of FIG. 1 to that of existing devices.

Although described with respect to aircraft applications, according to some embodiments, system 100 be functional for energy attenuation in automobiles, machinery, and other applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mechanism for decreasing kinetic energy comprising:
a carriage configured to connect to an object;
a first wire passing through a top portion of the carriage;
a second wire coterminous with the first wire at a top end and a bottom end, the second wire being substantially parallel with the first wire except for a deformed portion;
a spreading wheel axially fixed in a center position of the carriage between the first and second wires and configured to plastically deform the first and second wires from a substantially parallel configuration to conform to a circumferential surface on two opposing sides of the spreading wheel as the carriage moves from the top end to the bottom end; and
a pair of despreading wheels axially parallel to the spreading wheel and oriented proximal to the spreading wheel such that the first and second wires are plastically deformed by a circumferential surface of each of the despreading wheels such that the first and second wires are deformed again as the carriage moves from the top end to the bottom end.

2. The mechanism of claim 1, wherein the object is a seat of an aircraft and the seat is rigidly connected to the carriage.

3. The mechanism of claim 2, wherein the top and bottom ends of the first and second wires are perpendicular to a deck of the aircraft and fixed such that the seat can travel with diminished kinetic energy from the top ends to the bottom ends of the first and second wires.

4. The mechanism of claim 1, wherein the first and second wires have uniform thickness from the top end to the bottom end.

5. The mechanism of claim 1, wherein the first and second wires have an increasing thickness from the top end to the bottom end.

6. The mechanism of claim 1, wherein the first and second wires are configured to progressively diminish the kinetic energy of the carriage as the carriage travels from the top end to the bottom end.

7. The mechanism of claim 1, wherein the first and second wires are configured to linearly diminish the kinetic energy of the carriage when the carriage travels from the top end to the bottom end.

8. A method for decreasing kinetic energy comprising:
coupling a carriage configured to connect to an object;
passing a first wire passing through a top portion of the carriage;
passing a second wire coterminous with the first wire at a top end and a bottom end, the second wire being substantially parallel with the first wire except for a deformed portion;
passing the first and second wires around opposing sides of a spreading wheel axially fixed in a center position of the carriage, the spreading wheel, in operation, plastically deforming the first and second wires to conform to a circumferential surface of the spreading wheel when the carriage moves from the top end to the bottom end; and
passing the first and second wires between a pair of despreading wheels axially parallel to the spreading wheel and oriented proximal to the spreading wheel such that the first and second wires may be plastically deformed by a circumferential surface of the despreading wheels such that they are closer together than when on opposing sides of the spreading wheel.

9. The method of claim 8 wherein the object is a seat of an aircraft and the seat is rigidly connected to the carriage.

10. The method of claim 9, wherein the top and bottom ends of the first and second wires are configured to be perpendicular to a deck of the aircraft and fixed such that the seat can travel with diminished kinetic energy from the top ends to the bottom ends of the first and second wires.

11. The method of claim 8, wherein the first and second wires have uniform thickness from the top end to the bottom end.

12. The method of claim 8, wherein the first and second wires have an increasing thickness from the top end to the bottom end.

13. The method of claim 8, wherein the first and second wires are configured to progressively diminish the kinetic energy of the carriage as the carriage travels from the top end to the bottom end.

14. The method of claim 8, wherein the first and second wires are configured to linearly diminish the kinetic energy of the carriage when the carriage travels from the top end to the bottom end.

* * * * *